United States Patent

Chen

(10) Patent No.: US 8,423,098 B2
(45) Date of Patent: Apr. 16, 2013

(54) SLIDING MECHANISM

(75) Inventor: Chien-Chih Chen, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 812 days.

(21) Appl. No.: 12/274,482

(22) Filed: Nov. 20, 2008

(65) Prior Publication Data

US 2009/0137294 A1   May 28, 2009

(30) Foreign Application Priority Data

Nov. 28, 2007   (CN) .......................... 2007 1 0202743

(51) Int. Cl.
*H04M 1/02* (2006.01)
(52) U.S. Cl.
USPC .................. 455/575.4; 335/285; 335/306
(58) Field of Classification Search ............... 455/575.4; 335/285, 306
See application file for complete search history.

(56) References Cited

U.S. PATENT DOCUMENTS

| | | | |
|---|---|---|---|
| 2005/0059443 A1* | 3/2005 | Pan et al. ................... | 455/575.4 |
| 2008/0051163 A1* | 2/2008 | Kim et al. ................... | 455/575.4 |
| 2008/0119250 A1* | 5/2008 | Cho et al. ................... | 455/575.4 |
| 2008/0125200 A1* | 5/2008 | Park et al. ................... | 455/575.4 |
| 2008/0139261 A1* | 6/2008 | Cho et al. ................... | 455/575.4 |

FOREIGN PATENT DOCUMENTS

| | | |
|---|---|---|
| CN | 2659041 Y | 11/2004 |
| CN | 1578334 A | 2/2005 |
| CN | 1592316 A | 3/2005 |

* cited by examiner

*Primary Examiner* — April G Gonzales
(74) *Attorney, Agent, or Firm* — Altis Law Group, Inc.

(57) ABSTRACT

A sliding mechanism (20) used in a portable electronic device is described. The magnetic forces created between facing similar poles of a first magnetic component (24) and a second magnetic component (25) drives the cover section (22) to the open or closed position. Two third magnetic components (26) are received and secured in the sliding slot (214) and stably secure the cover section (22) in the open or closed position.

18 Claims, 6 Drawing Sheets

SLIDING MECHANISM

BACKGROUND

1. Field of the Invention

The present invention relates to sliding mechanisms and, particularly, to a sliding mechanism used in a portable electronic device with two or more housings.

2. Description of Related Art

With the ongoing development of communication technologies, one kind of slidable portable electronic device driven by magnetic forces has been known in the market. Specifically, such slidable portable electronic device usually includes a main housing, a slidable housing, and a sliding mechanism. The sliding mechanism drives the slidable housing to slide with respect to the main housing under magnetic forces.

The sliding mechanism usually includes a body section, a cover section, a first magnetic component, and a second magnetic component. The first magnetic component is fixed to the body section. The second magnetic component is fixed to the cover section. The first and second magnetic components cooperatively generate a magnetic force therebetween, under which the cover section can slide relative to the body section. Thus, as the main housing and the slidable housing are respectively fixed to the body section and the cover section of the sliding mechanism, the slidable housing can slide relative to the main housing by the sliding mechanism.

However, a limiting structure is required in the sliding mechanism for limiting the movement of the cover section and/or achieving a stable closed position of the sliding mechanism. Such limiting structure make the whole sliding mechanism relatively complex, thereby increasing manufacturing cost.

Therefore, there is room for improvement within the art.

BRIEF DESCRIPTION OF THE DRAWINGS

Many aspects of the sliding mechanism can be better understood with reference to the following drawings. These drawings are not necessarily drawn to scale, the emphasis instead being placed upon clearly illustrating the principles of the present sliding mechanism. Moreover, in the drawings like reference numerals designate corresponding sections throughout the several views.

DETAILED DESCRIPTION OF EXEMPLARY EMBODIMENT

The present sliding mechanism is suitable for portable electronic devices, such as mobile phone terminals, digital cameras, and so on.

Figure 1:
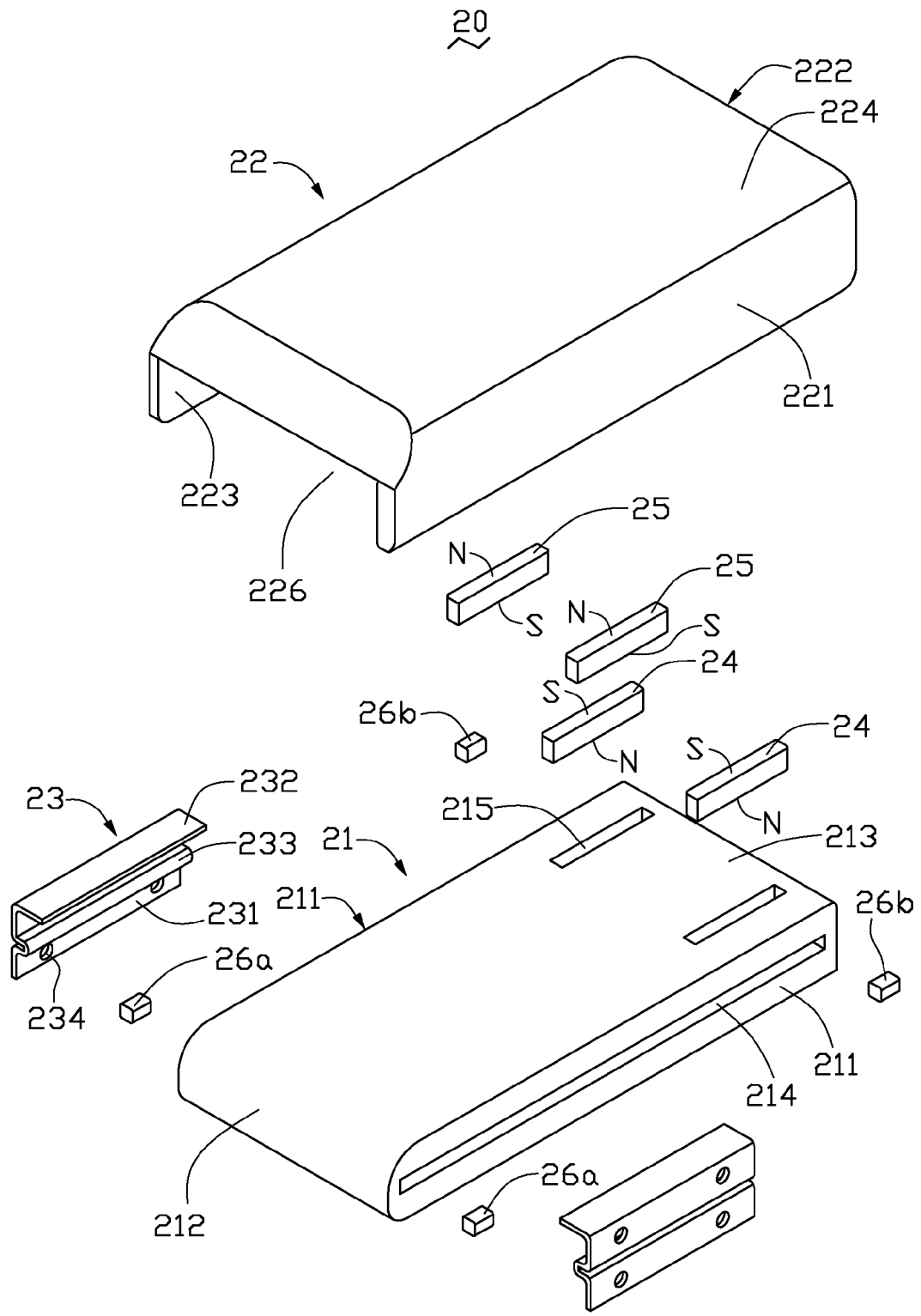
FIG. 1 is an exploded, isometric view of a sliding mechanism, in accordance with a exemplary embodiment.
Figure 2:
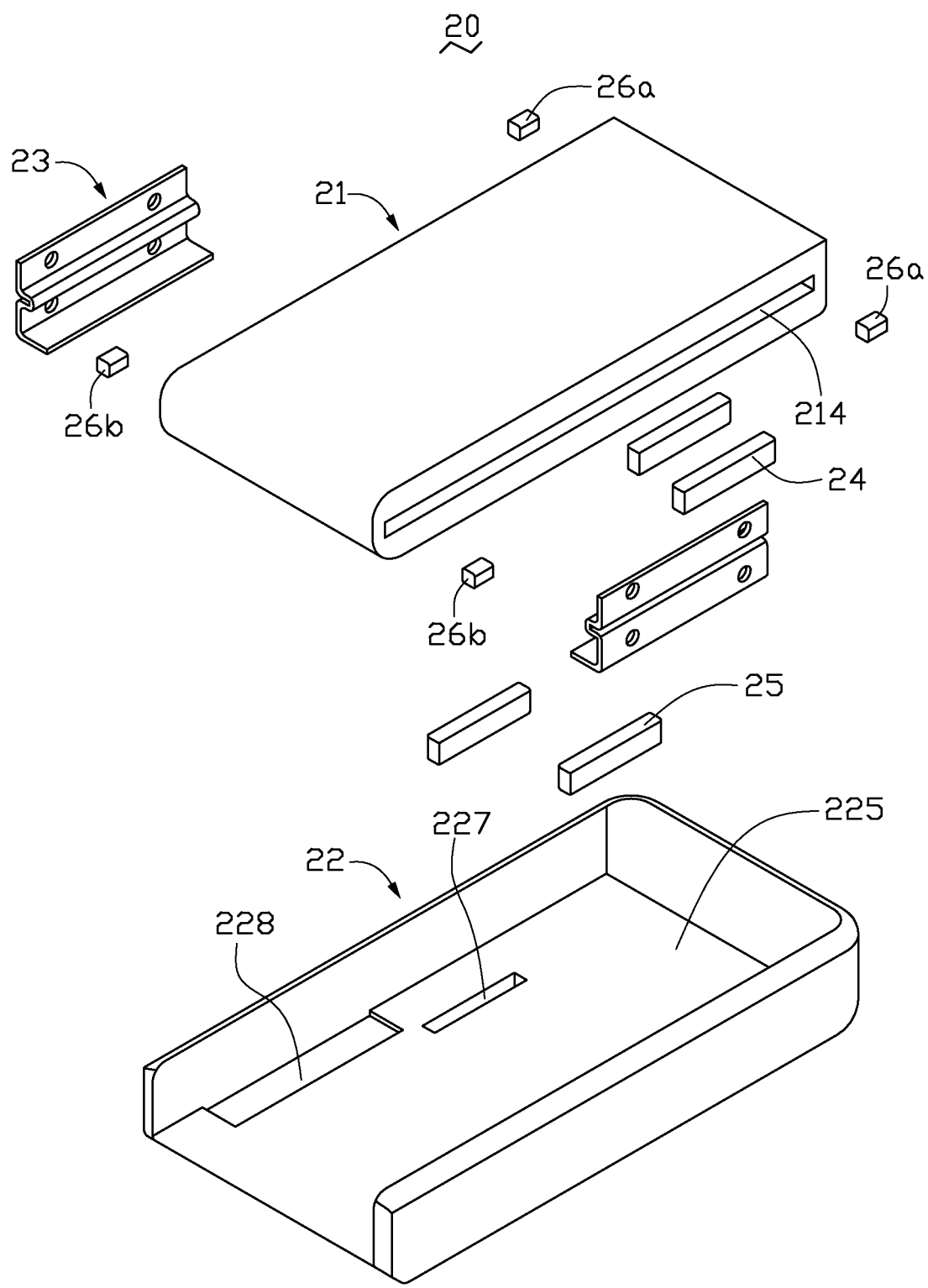
FIG. 2 is another exploded, isometric view of the sliding mechanism shown in FIG. 1.

FIGS. 1 and 2 show two aspects of an exemplary sliding mechanism 20. The sliding mechanism 20 includes a body section 21, a cover section 22, two guiding rails 23, two first magnetic components 24, two second magnetic components 25 and two pairs of third magnetic components 26a, 26b. The cover section 22 is slidably mounted to the body section 21. The first and second magnetic components 24 and 25 are securely mounted to the body section 21 and the cover section 22, respectively. Additionally, each the first and second magnetic components 24 and 25 have a surface facing each other. The facing surfaces of the magnetic components 24 and 25 are provided with the same magnetic polarity.

The body section 21 is generally rectangular and includes two opposite side portions 211, a top portion 212, a bottom portion 213. A sliding slot 214 is longitudinally defined in each side portions 211. The body 21 has two first securing slits 215 defined in the bottom portion 213. The two securing slits 215 are parallel to each other. The securing slits 215 are used to receive and secure the first magnetic components 24 therein.

The cover section 22 is generally rectangular. The cover section 22 includes a first side portion 221, a second side portion 222, a third side portion 223, and a bottom portion 224. The first side portion 221, the second side portion 222, the third side portion 223, and the bottom portion 224 cooperatively enclose an accommodating cavity 225 with a cutout 226. The cutout 226 is located opposite to the second side portion 222. The cover section 22 has two mounting portions 228 disposed adjacent to the cutout 226. The bottom portion 224 defines two second securing slits 227 therein for receiving and securing the second magnetic components 25. The two second securing slits 227 are parallel to each other.

The guiding rails 23 have a generally F-shaped cross-section and include a side portion 231 and a bottom portion 232 connecting with the side portion 231. The side portion 231 defines a plurality of fastening holes 234 therein. The side portion 231 has a protruding bar 233 protruding outwardly therefrom towards the bottom portion 232. The protruding bar 233 is configured (i.e., structured/arranged) such that the protruding bar 233 can be received in the sliding slot 214 and slide along the sliding slot 214. The guiding rails 23 is made of a flexible magnetic material such as but not limited to iron or steel.

Figure 3:
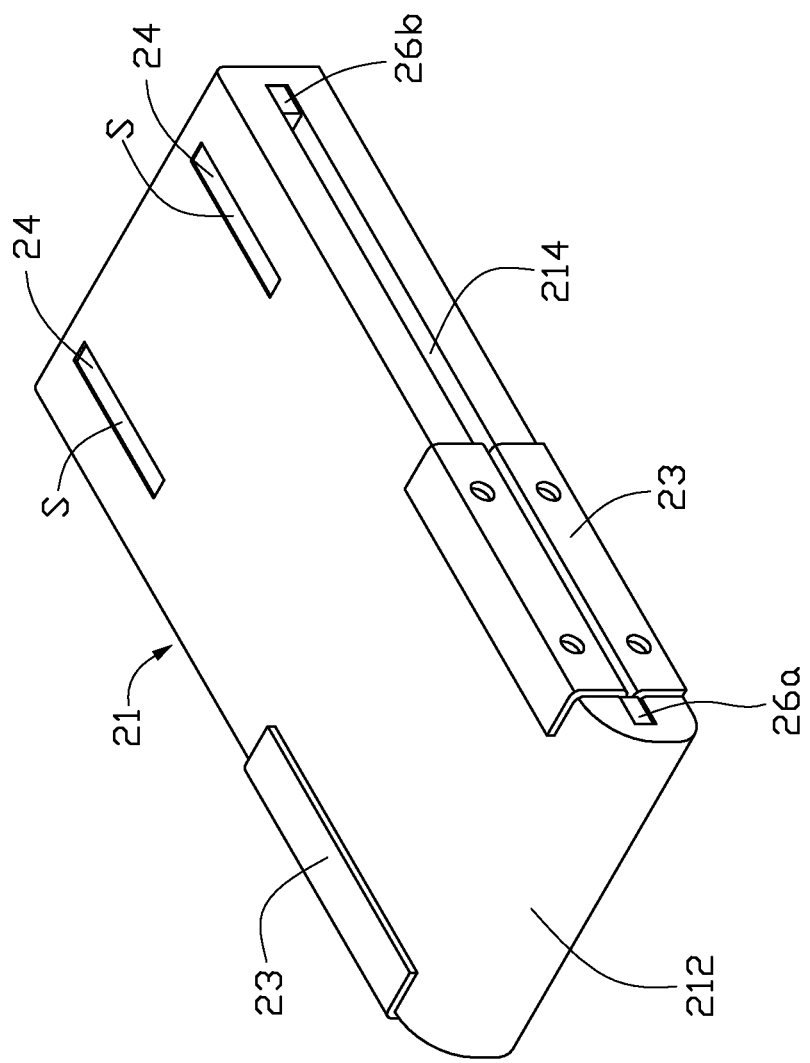
FIG. 3 is an isometric view of the sliding mechanism shown in FIG. 1.
Figure 4:
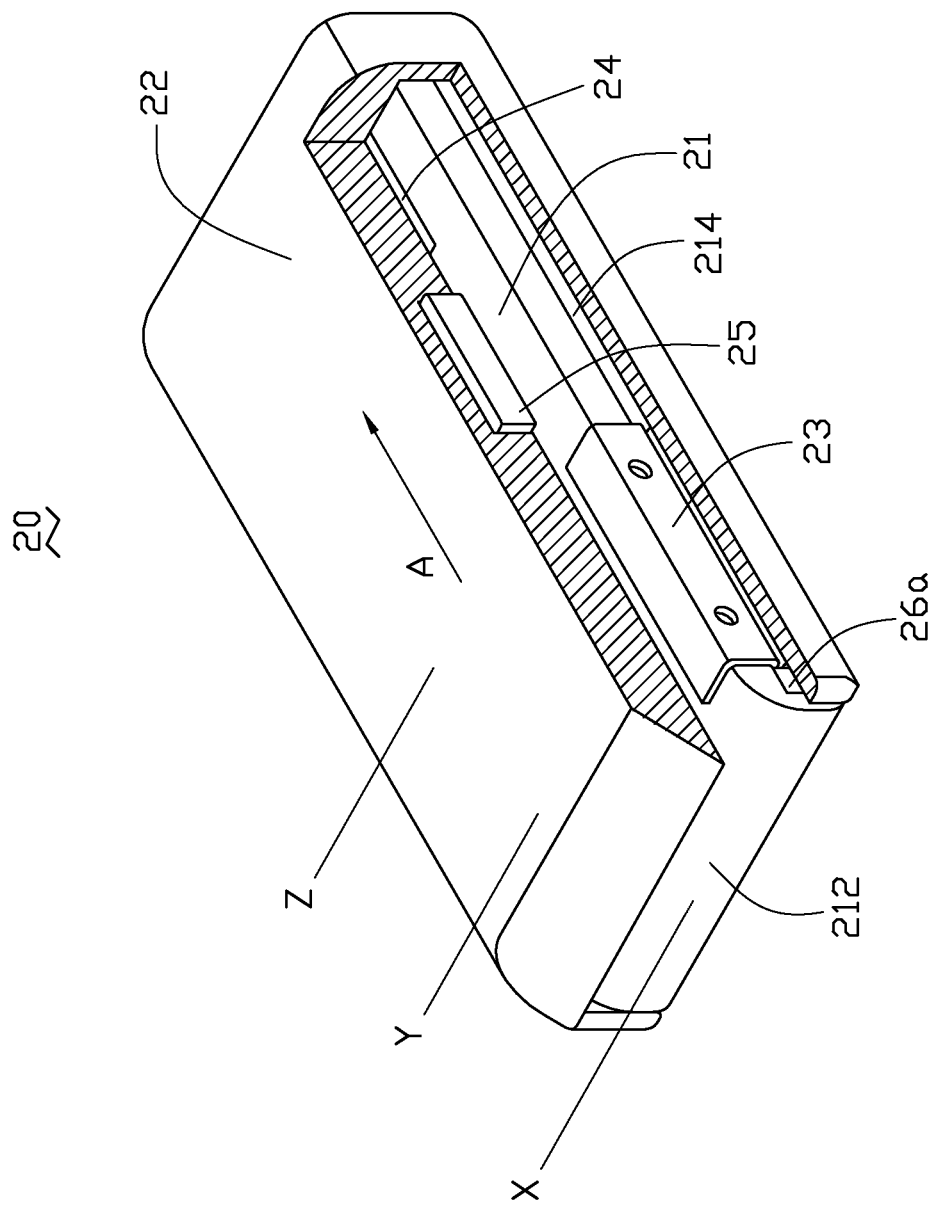
FIG. 4 is the first position of side views of the sliding mechanism shown in FIG. 3, corresponding to an opening/closing operation of the sliding mechanism.

Referring further to FIGS. 3 and 4, when assembling the sliding mechanism 20, the first magnetic components 24 are secured in the first securing slits 215 of the body 21 with, for example, the S-Pole of the first magnetic components 24 facing the cover section 22. The second magnetic components 25 are secured in the second securing slits 227 with the same polarity pole, i.e., S-Pole, facing the body section 21. Therefore, poles of the same polarity, e.g., the S-poles, of magnetic components 24, 25 face each other. The two pairs of third magnetic components 26a, 26b are secured in the two opposite ends of the sliding slot 214, respectively. The guiding rails 23 engage into the corresponding sliding slots 214. The cover section 22 then covers the body section 21 and the top portion 212 of the body section 21 passes through the cutout 226. Thus, the body section 21 is in the accommodating cavity 225 of the cover section 22. The guiding rails 23 are respectively attached to the third side portions 223 of the cover section 22 by fastening means (e.g., screw) fastening into the fastening holes 234. The guiding rails 23 further adheres to the mounting portion 228 of the cover section 22. At this time, the first and second magnetic components 24, 25 are at different longitudinal positions along the sliding axis A. Therefore, the S-poles of the two magnetic components 24, 25 do not directly face each other and the first magnetic components 24 and the second magnetic components 25 cooperatively generate a magnetic repelling force therebetween for driving one magnetic component to move away from the other in the direction A. The pair of third magnetic components 26a magnetically attract the guiding rails 23. Thus, the cover section 22 stably maintains a closed position relative to the body section 21.

Figure 5:
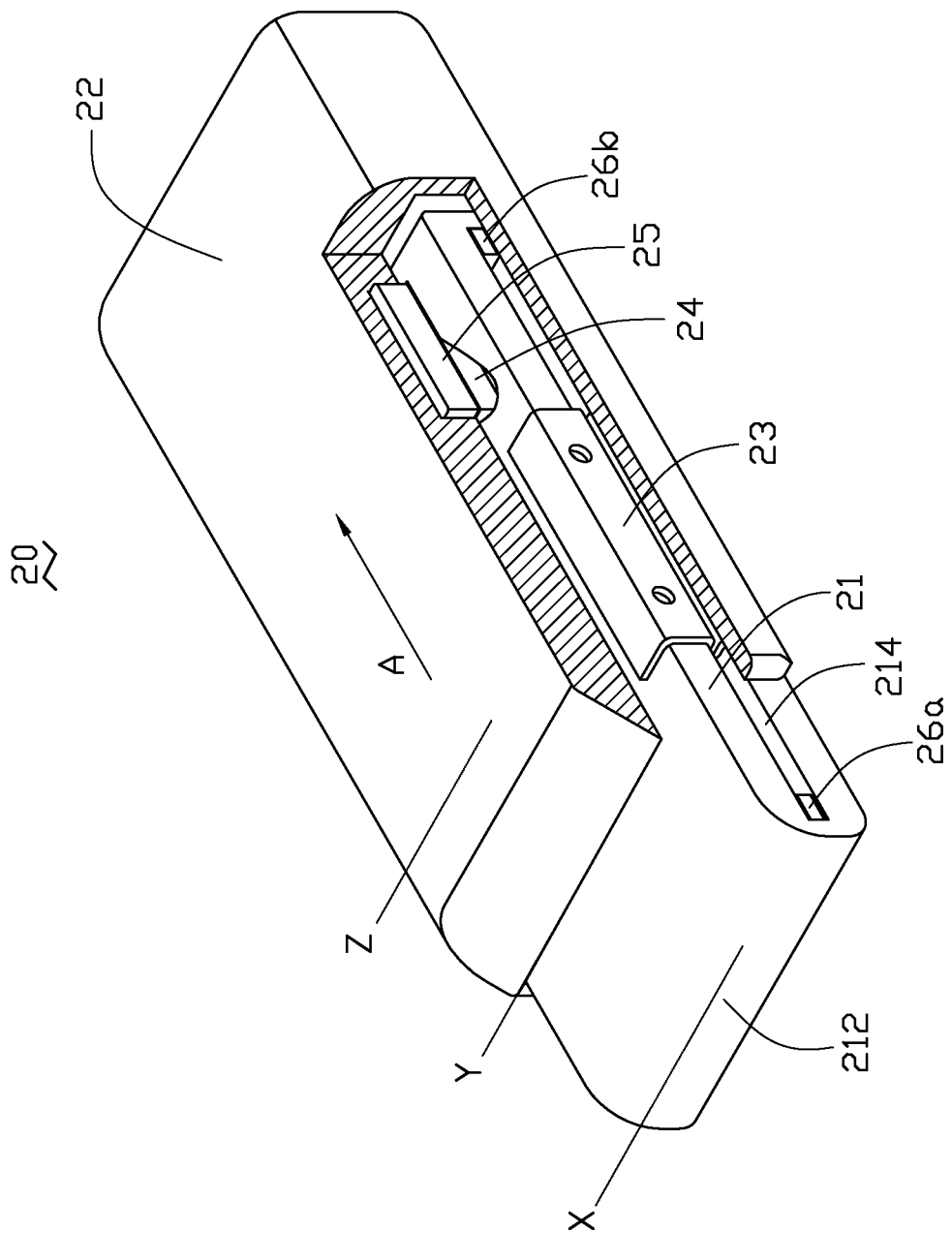
FIG. 5 is the second position of side views of the sliding mechanism shown in FIG. 3, corresponding to an opening/closing operation of the sliding mechanism.
Figure 6:
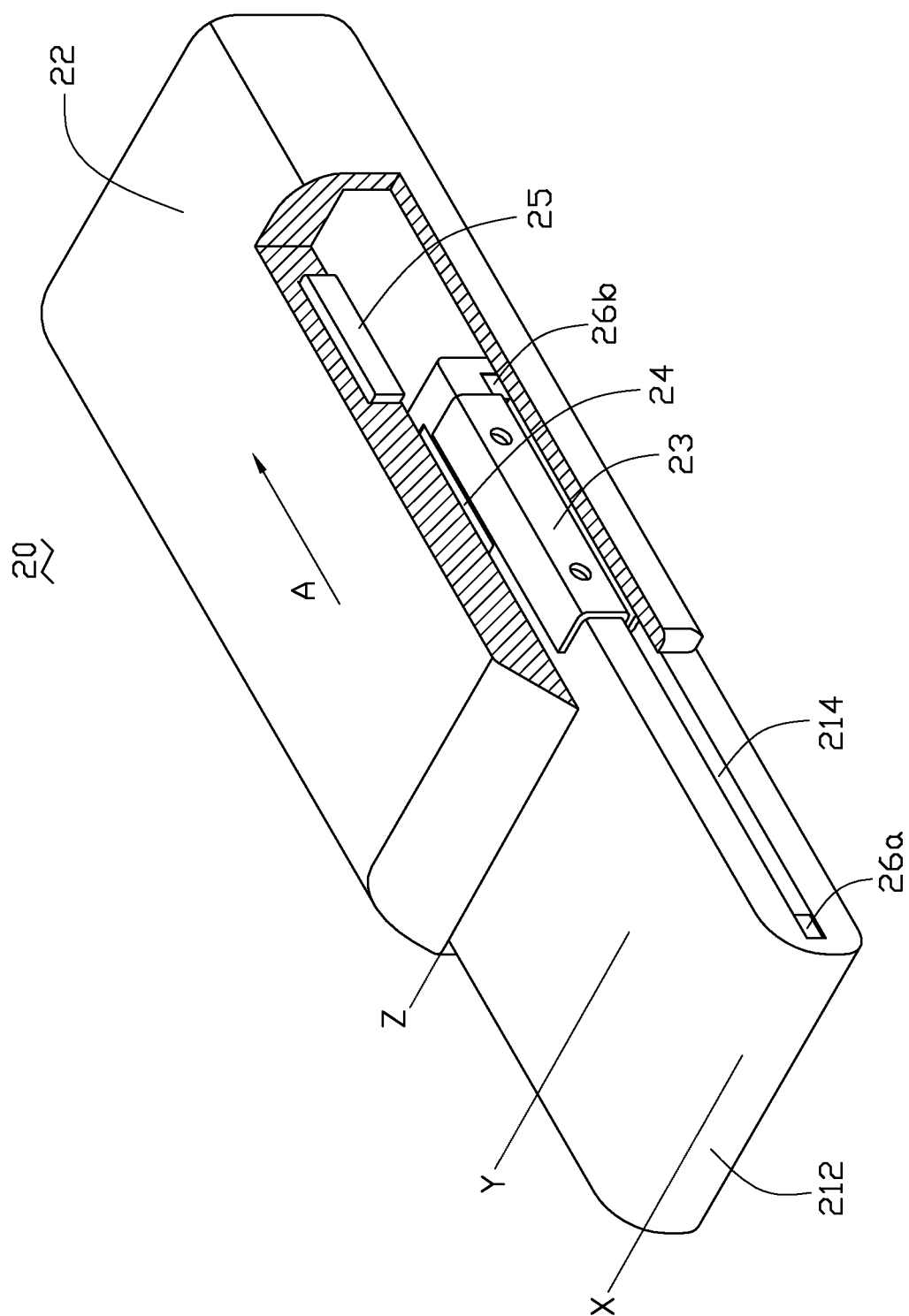
FIG. 6 is the third position of side views of the sliding mechanism shown in FIG. 3, corresponding to an opening/closing operation of the sliding mechanism.

FIGS. 4 through 6 show the cover section 22 moving from the closed, starting position to the open position. The cover section 22 may be pushed to slide along an arrow A in FIG. 4 from a closed, starting position (identified by broken line X) until the cover section 22 reaches the intermediate position (FIG. 5; identified by broken line Y). In the intermediate position, the first and second magnetic components 24, 25 are at the same longitudinal position along the sliding axis A. Therefore, the S-poles of the first and second magnetic components 24, 25 directly face each other and the magnetic force generated between the first magnetic components 24 and the second magnetic components 25 is perpendicular to the longitudinal direction of the sliding slot 214. Thus, the magnetic force cannot move the cover section 22 along the sliding slot 214 towards the open position and cover section 22 stays in this intermediate position. As the cover section 22 is further pushed by a user to pass the intermediate position, the S-poles of the first and second magnetic components 24, 25 no longer directly face each other and a magnetic repelling force along the longitudinal direction of the sliding slot 214 appears between the first magnetic components 24 and the second magnetic components 25. This magnetic repelling force moves the cover section 22 along the sliding slot 214 and toward the stopping position (identified by a broken line Z). Therefore, the cover section 22 automatically slides to the open position. When the cover section 22 reaches the open position, the pair of third magnetic components 26b magnetically attract the guiding rails 23 to secure the cover section 22 in the open position. Thus, the cover section 22 stays in the open position.

To close the cover section 22, the cover section 22 may be pushed to slide in a direction opposite to arrow A, from the open position until the cover section 22 reaches the intermediate position. In the intermediate position, as described above, the magnetic repelling force between directly facing S-poles cannot move the cover section 22 along the sliding slot 214. Therefore, the cover section 22 stays in the intermediate position. As the cover section 22 is pushed by the user to pass the intermediate position, as also described above, the S-poles of the first and second magnetic components 24, 25 no longer directly face each other and a magnetic repelling force along the longitudinal direction of the sliding slot 214 appears between the first magnetic components 24 and the second magnetic components 25. This magnetic repelling force moves the cover section 22 away from the body section 21 along the sliding slot 214 and toward the closed position. Therefore, the cover section 22 automatically slides to the closed position under the magnetic force. As the cover section reaches the closed position, the pair of third magnetic components 26a magnetically attract the guiding rails 23 to stably secure the cover section 22 in the staring position. Thus, the cover section 22 stays in the closed position.

Some advantages of the present embodiment are as follows. The sliding mechanism 20 can work by the magnetic forces created therewithin. Further, another magnetic force of the third magnetic components 26 attracts the guiding rails 23, and thus maintaining the stable open position and/or the stable closed position of the cover section 22. The sliding mechanism 20 is relatively simple in structure and the manufacturing cost decreases.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A sliding mechanism, comprising:
   a body section;
   a cover section;
   a first magnetic component being mounted to the body section and having two opposing magnetic poles;
   a second magnetic component being mounted to the cover section and having two opposing magnetic poles, wherein similar poles of each magnetic component face each other;
   wherein one of the body section and the cover section defining a sliding slot on a side thereof, the other of the body section and the cover section having a guiding rail corresponding to the sliding slot, the guiding rail being slidably engaged in the sliding slot, the magnetic repelling forces generated between the first and second magnetic components when the similar poles are not directly facing each other, driving the cover section to the open or closed position; and
   two third magnetic components being received and secured in the opposite ends of the sliding slot, one of the third magnet components directly magnetically attracting the guiding rail to stably maintain the cover in one of the open or closed position and the other of the third magnet components directly magnetically attracting the guiding rail to stably maintain the cover in the other of the open or closed position.

2. The sliding mechanism as claimed in claim 1, wherein one of the body section and the cover section defines another sliding slot on its other side, the other of the body section and the cover section has another guiding rail corresponding to the another sliding slot, the another guiding rail is slidably engaged in the another sliding slot, the sliding mechanism further includes another two third magnetic components, one of the another third magnet components cooperates with the guiding rail to stably maintain the cover in one of the open or closed position and the other of the another third magnet components cooperates with the guiding rail to stably maintain the cover in the other of the open or closed position.

3. The sliding mechanism as claimed in claim 1, wherein the guiding rail has an F-shaped cross-section.

4. The sliding mechanism as claimed in claim 1, wherein the body section is generally rectangular and defines a sliding slot longitudinally along each side portion.

5. The sliding mechanism as claimed in claim 1, wherein the guiding rail is made of a flexible magnetic material.

6. The sliding mechanism as claimed in claim 1, wherein the body section has two parallel first securing slits, the securing slits used to receive and secure the first magnetic components therein.

7. The sliding mechanism as claimed in claim 1, wherein the cover section is generally rectangular, the cover section has a first side portion, a second side portion, a third side portion and a bottom portion, the first side portion, the second side portion, the third side portion and the bottom portion define an accommodating cavity, the cover section has two mounting portions adjacent to a cutout in a fourth wall used to receive and secure the first magnetic components therein, the bottom portion defines two parallel second securing slits, used to receive and secure the second magnetic components therein.

8. The sliding mechanism as claimed in claim 1, wherein the guiding rail is mounted to one of the body section or the cover section.

9. The sliding mechanism as claimed in claim 1, wherein the guiding rail adheres to one of the body section or the cover section.

10. A sliding mechanism, comprising:
a body section;
a cover section;
a first magnetic component being mounted to the body section;
a second magnetic component being mounted to the cover section and having the same pole as the first magnetic;
wherein one of the body section and the cover section defining a sliding slot on a side thereof, the other of the body section and the cover section having a guiding rail corresponding to the sliding slot, the guiding rail being slidably engaged in the sliding slot; when the first magnetic component and the second magnetic component are not directly facing each other, a magnetic repelling force generated between the first magnetic component and the second magnetic component to drive the cover section to the open or closed position; and
two third magnetic components being received and secured in the opposite ends of the sliding slot;
wherein the guiding rail is made of a flexible magnetic material, the cover is retained at a closed position by an attractive force between one of the third magnet components and the guiding rail; the cover is retained at an open position by an attractive force between the other of the third magnet components and the guiding rail.

11. The sliding mechanism as claimed in claim 10, wherein one of the body section and the cover section defines another sliding slot on its other side, the other of the body section and the cover section has another guiding rail corresponding to the another sliding slot, the another guiding rail is slidably engaged in the another sliding slot, the sliding mechanism further includes another two third magnetic components, one of the another third magnet components cooperates with the guiding rail to stably maintain the cover in one of the open or closed position and the other of the another third magnet components cooperates with the guiding rail to stably maintain the cover in the other of the open or closed position.

12. The sliding mechanism as claimed in claim 10, wherein the guiding rail has an F-shaped cross-section.

13. The sliding mechanism as claimed in claim 10, wherein the body section is generally rectangular and defines a sliding slot longitudinally along each side portion.

14. The sliding mechanism as claimed in claim 10, wherein the body section has two parallel first securing slits, the securing slits used to receive and secure the first magnetic components therein.

15. The sliding mechanism as claimed in claim 10, wherein the cover section is generally rectangular, the cover section has a first side portion, a second side portion, a third side portion and a bottom portion, the first side portion, the second side portion, the third side portion and the bottom portion define an accommodating cavity, the cover section has two mounting portions adjacent to a cutout in a fourth wall used to receive and secure the first magnetic components therein, the bottom portion defines two parallel second securing slits, used to receive and secure the second magnetic components therein.

16. The sliding mechanism as claimed in claim 10, wherein the guiding rail is mounted to one of the body section or the cover section.

17. The sliding mechanism as claimed in claim 10, wherein the guiding rail adheres to one of the body section or the cover section.

18. The sliding mechanism as claimed in claim 10, wherein the guiding rail is made of iron or steel.

* * * * *